US010330160B2

United States Patent
Goodell (10) Patent No.: US 10,330,160 B2
(45) Date of Patent: Jun. 25, 2019

(54) DEVICES AND SYSTEMS TO PREVENT BRAKE DUST ACCUMULATION IN DRUM BRAKES

(71) Applicant: Bendix Commercial Vehicle Systems, LLC, Elyria, OH (US)

(72) Inventor: David J. Goodell, Beaverton, OR (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 0 days.

(21) Appl. No.: 15/801,386

(22) Filed: Nov. 2, 2017

(65) Prior Publication Data

US 2019/0128350 A1 May 2, 2019

(51) Int. Cl.
| | |
|---|---|
| *F16D 66/02* | (2006.01) |
| *F16D 65/10* | (2006.01) |
| *F16D 65/22* | (2006.01) |
| *F16D 65/00* | (2006.01) |
| *F16D 65/02* | (2006.01) |

(52) U.S. Cl.
CPC ......... *F16D 65/10* (2013.01); *F16D 65/0031* (2013.01); *F16D 65/22* (2013.01); *F16D 2065/1328* (2013.01)

(58) Field of Classification Search
CPC ................. F16D 65/10; F16D 65/0031; F16D 2065/1328
See application file for complete search history.

(56) References Cited

U.S. PATENT DOCUMENTS

| | | | | |
|---|---|---|---|---|
| 1,737,325 | A * | 11/1929 | Olivier | F16D 65/10 188/218 A |
| 1,745,301 | A * | 1/1930 | Johnston | F16D 65/0006 188/218 A |
| 1,828,972 | A | 10/1931 | La Brie | |
| 1,865,312 | A * | 6/1932 | Goostray | F16D 65/10 188/218 R |
| 1,966,169 | A | 7/1934 | Forbes | |
| 1,995,691 | A * | 3/1935 | Stough | F16D 65/0006 188/218 A |
| 2,174,611 | A * | 10/1939 | Ash | F16D 65/10 188/218 R |
| 2,532,086 | A * | 11/1950 | Chapman | F16D 65/0006 188/218 A |

(Continued)

FOREIGN PATENT DOCUMENTS

| | | | | |
|---|---|---|---|---|
| DE | 102004004163 | A1 * | 8/2005 | ............ F16D 66/02 |
| GB | 2127115 | A * | 4/1984 | ............ F16D 65/10 |

*Primary Examiner* — Bradley T King
*Assistant Examiner* — Mahbubur Rashid
(74) *Attorney, Agent, or Firm* — Crowell & Moring LLP (57) ABSTRACT

A brake drum usable in a vehicle includes a substantially cylindrical wall having an end surface at one axial end thereof, with the substantially cylindrical wall defining a radially inwardly facing wear surface to be engaged by a friction lining upon brake actuation during operation of the vehicle. A radially extending drum section is joined by way of a corner section to another axial end of the substantially cylindrical wall and, together with the substantially cylindrical wall and the corner section, forms a drum interior volume. To provide for discharge of particles from the drum interior volume, the substantially cylindrical wall has a circumferentially extending cut away section in the wear surface located adjacent to the one axial wall end.

15 Claims, 6 Drawing Sheets

(56) References Cited

U.S. PATENT DOCUMENTS

| | | | |
|---|---|---|---|
| 2,702,613 A * | 2/1955 | Walther, Sr. | F16D 65/10 188/218 R |
| 2,941,631 A * | 6/1960 | Fosberry | F16D 65/0006 188/218 A |
| 3,016,269 A * | 1/1962 | De Lorean | F16D 65/10 188/1.11 W |
| 3,066,766 A * | 12/1962 | Minor | F16D 65/827 188/218 R |
| 4,830,150 A | 5/1989 | Denton | |
| 4,989,697 A * | 2/1991 | Denton | F16D 65/10 |
| 5,162,053 A | 11/1992 | Kowalski, Jr. | |
| 5,964,323 A | 10/1999 | Henry | |
| 6,056,089 A | 5/2000 | Karlsson et al. | |
| 6,241,056 B1 * | 6/2001 | Cullen | F16D 65/10 188/218 R |
| 7,325,659 B2 * | 2/2008 | Pfaff | F16D 51/16 188/218 R |
| 9,145,937 B2 * | 9/2015 | Fakhoury | F16D 65/827 |
| 9,322,443 B2 * | 4/2016 | Bordere | F16D 65/10 |
| 9,709,114 B2 * | 7/2017 | Fakhoury | F16D 65/827 |
| 2007/0000740 A1 | 1/2007 | Raab | |
| 2009/0014263 A1 * | 1/2009 | Levering | F16D 65/10 188/218 R |
| 2011/0005876 A1 * | 1/2011 | Jenkinson | F16D 65/10 188/218 R |
| 2011/0278102 A1 * | 11/2011 | Cornett | F16D 65/10 188/1.11 W |
| 2012/0199426 A1 | 8/2012 | Levering et al. | |
| 2013/0153341 A1 * | 6/2013 | Capps | F16D 65/10 188/1.11 W |
| 2014/0076673 A1 | 3/2014 | Tsiberidis | |
| 2014/0116824 A1 | 5/2014 | Jakubowski et al. | |
| 2015/0001013 A1 | 1/2015 | Mennie | |
| 2015/0122601 A1 | 5/2015 | Rocca-Serra | |
| 2015/0159715 A1 | 6/2015 | Plantan | |
| 2016/0017947 A1 * | 1/2016 | Fakhoury | F16D 65/827 188/218 R |
| 2016/0195149 A1 * | 7/2016 | Pu | F16D 65/10 188/218 R |

* cited by examiner

DEVICES AND SYSTEMS TO PREVENT BRAKE DUST ACCUMULATION IN DRUM BRAKES

BACKGROUND OF THE INVENTION

Field of the Invention

Excessive or uneven brake drum surface wear can be produced by brake dust generated during braking operations. This issue is addressed by improved brake drum dust egress channels and specific egress path design resulting in both enhanced brake lining durability and extended brake drum life.

Description of Related Art

Wear between metallic particles on brake lining surfaces and a brake drum can lead to brake drum scoring problems such as those documented by Y. J. Huang and John Yang in *Excessive Brake Drum Wear (EBDW) and Its Prevention* (SAE Technical Paper Series 2007-01-1022, 2007 World Congress, Detroit, Mich., Apr. 16-19, 2007). Keeping drum temperature as low as possible to reduce the propensity of onset sintering through design, ventilation, or other means, increasing drum hardness and reducing ferrite content to decrease drum wear rates, and eliminating rivet holes and increasing compactness of friction linings, again to reduce the propensity of onset sintering, are among the measures identified in the Huang et al. paper as approaches that could be taken to address excessive brake drum wear issues.

Various other approaches to address brake component wear and cooling issues have been taken as well. U.S. Pat. No. 4,830,150 to Denton, for example, discloses a strip with fins for installation within a brake drum without holes to create a flow of drying air across the drum. U.S. Pat. No. 6,056,089 to Karlsson et al. concerns a brake system including a number of passages in a surrounding brake drum to lead air to brakes for cooling purposes, while U.S. Patent Application Publication 2012/0199426 A1 to Levering et al. discloses a brake drum with an air scoop designed into the body of the drum, with air being re-directed inboard to assist in cooling the brakes.

U.S. Patent Application Publication 2015/0001013 A1 to Mennie discloses a brake lining having two holes, with one hole for "air in" and another hole for "air out." As air passes over the brake lining, the dust is collected. Air can also be suctioned through the device to collect brake dust, with the air flow being managed by a solenoid.

U.S. Patent Application Publication 2015/0159715 A1 to Plantan discloses brake linings with channels through the linings to promote air cooling.

Other documents of interest are U.S. Pat. No. 1,828,972 to LaBrie, U.S. Pat. No. 1,966,169 to Forbes, U.S. Pat. No. 5,162,053 to Kowalski, Jr., U.S. Pat. No. 5,964,323 to Henry, U.S. Patent Application Publication 2007/0000740 A1 to Raab, U.S. Patent Application Publication 2014/0076673 to Tsiberidis, U.S. Patent Application Publication 2014/0116824 A1 to Jakubowski et al., and U.S. Patent Application Publication 2015/0122601 to Rocca-Serra.

SUMMARY OF THE INVENTION

After a vehicle travels 200,000 to 400,000 miles, accumulating dust generated during vehicle braking operations can damage vehicle drum brake wear surfaces, forming grooves on inboard and outboard sides of those surfaces and accelerating the rate at which the surfaces deteriorate. It is one object of the present invention to provide suitable egress paths for brake dust and other contaminants from a drum interior volume or chamber to try to mitigate this damage, without incorporating alterations into brake shoes or friction linings of the drum brake arrangement.

According to the present invention, therefore, a brake drum usable in a vehicle includes a substantially cylindrical wall having an end surface at one axial end thereof, with the substantially cylindrical wall defining a radially inwardly facing wear surface to be engaged by a friction lining upon brake actuation during operation of the vehicle. A radially extending drum section is joined by way of a corner section to another axial end of the substantially cylindrical wall and, together with the substantially cylindrical wall and the corner section, forms a drum interior volume. To provide for discharge of particles from the drum interior volume, the substantially cylindrical wall has a circumferentially extending cut away section in the wear surface located adjacent to the one axial wall end.

Preferably, the circumferentially extending cut away section is one of a plurality of circumferentially extending cut away sections distributed around the radially inwardly facing wear surface. The drum can also include holes, extending between an interior drum surface and an exterior drum surface, distributed around the drum at locations between the wear surface and the radially extending drum section. In one preferred configuration, the cut away section defines a trapezoid including shorter and longer bases in plan view, with the shorter base located closer to the radially extending drum section than the longer base. The substantially cylindrical wall may further includes chamfers at opposite axial ends of the wear surface, with the cut away section intersecting one of the chamfers adjacent the end surface at the one axial end of the substantially cylindrical wall. Longer bases of the trapezoids formed the cut away sections may be dimensioned to extend from one inch to five inches circumferentially in the substantially cylindrical wall. One beneficial feature of the invention is that a wear limit for the brake drum can be deemed to be present when the wear surface is sufficiently worn that the raised wear surface is eliminated.

A process of discharging particles from a brake drum interior volume, and a vehicle including the inventive drum brake are also discussed.

DETAILED DESCRIPTION OF THE INVENTION

Figure 1:
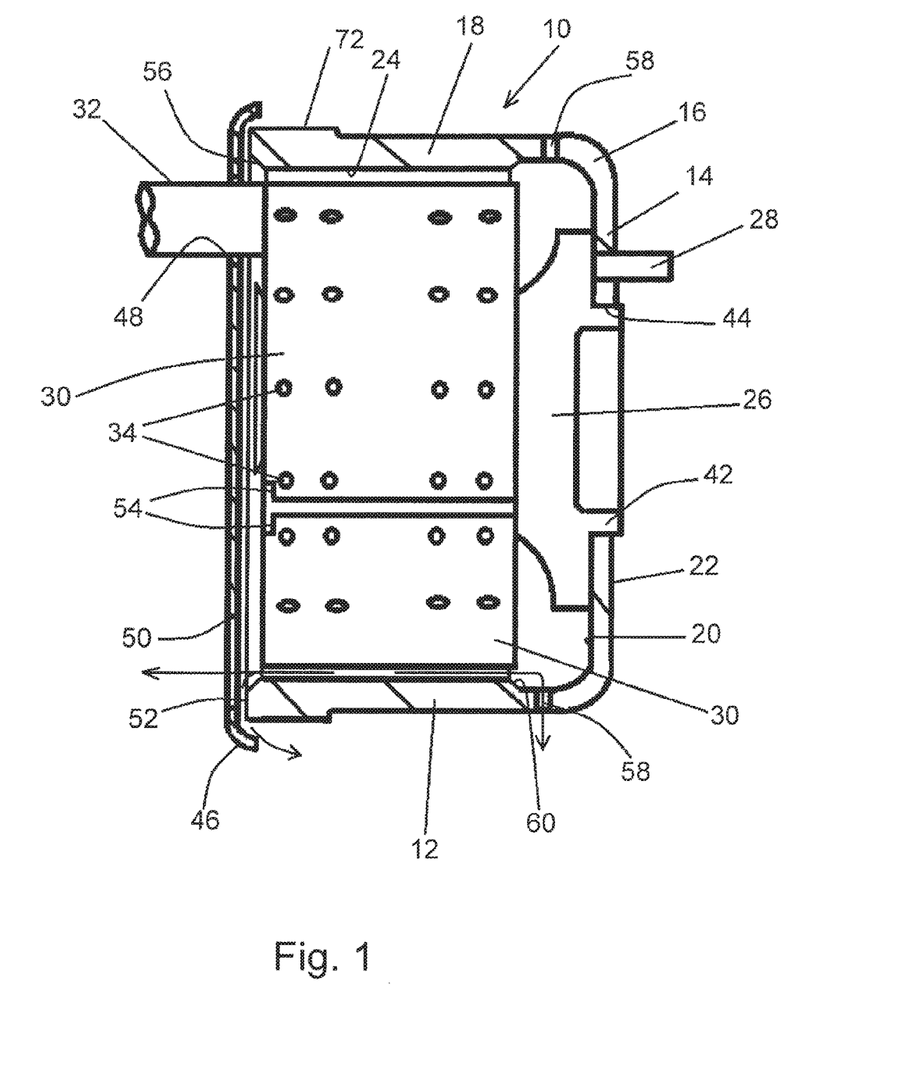
FIG. 1 is a schematic, part-sectional side view showing certain components of an overall drum brake arrangement.

The schematic part-sectional side view supplied by FIG. 1 illustrates certain components of an overall drum brake arrangement 10. The arrangement 10 includes a brake drum 12 having a radially extending drum section 14 at a first side of the arrangement, which may be either a vehicle inboard side or a vehicle outboard side. The radially extending drum section 14 is joined by way of a corner section 16 to a circumferentially extending, cylindrical wall 18 of the drum, projecting from the corner section 16 towards a second side of the arrangement, opposite the first side. The radially extending drum section 14, the corner section 16, and the cylindrical wall 18 share an interior drum surface 20 and an exterior drum surface 22, and a part of the interior drum surface 20, located along the cylindrical wall 18, forms a raised wear surface 24.

Figure 2:
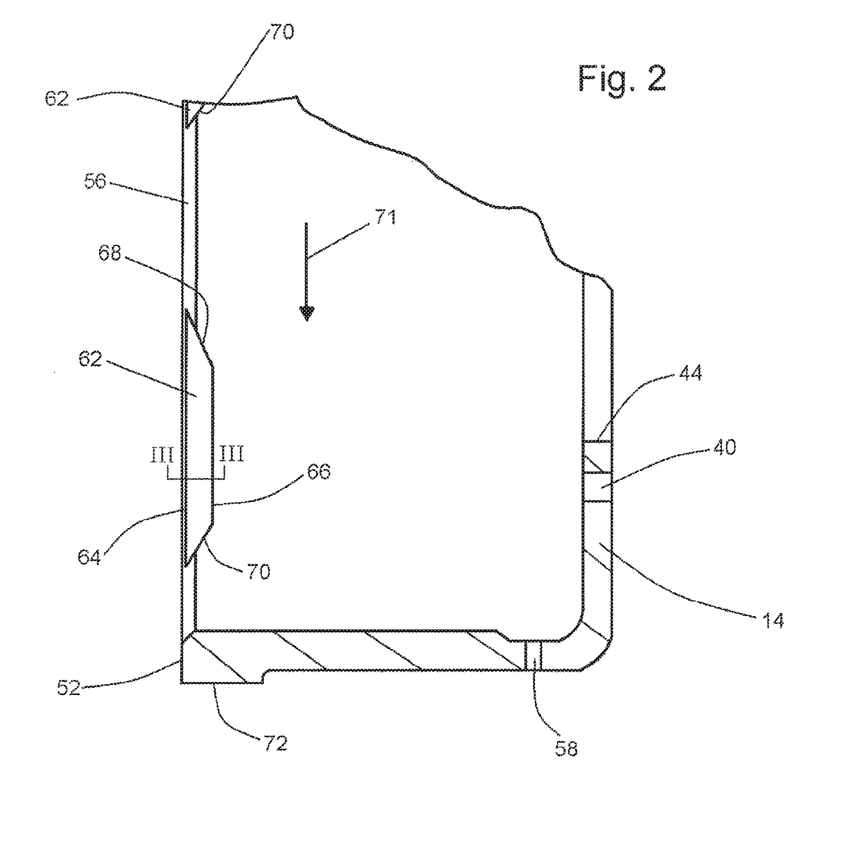
FIG. 2 is an enlarged, part-sectional view of the drum of the arrangement shown in FIG. 1.
Figure 5:
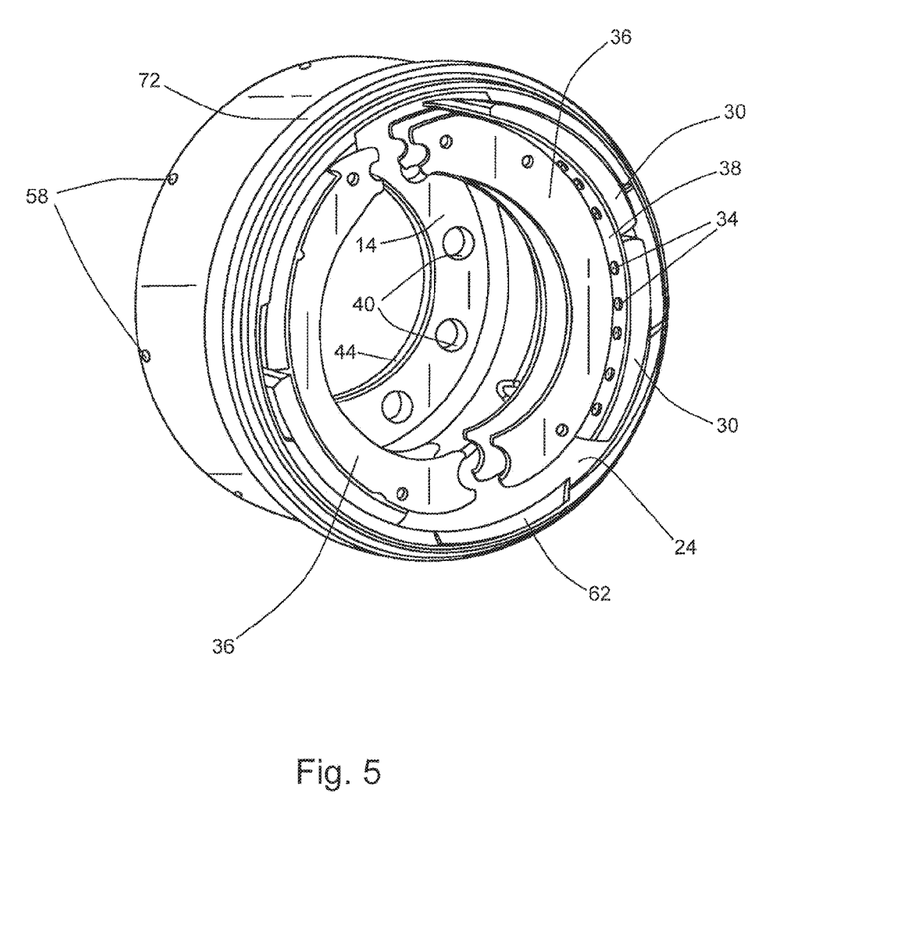
FIG. 5 is a pictorial view of the drum shown in FIG. 4 but with brake shoes including friction linings received within the drum.

The radially extending section 14 of the brake drum 12 is securable by way of wheel studs to a rotatable hub 26, which rotates on a fixed axle spindle such that rotation of the hub 26 produces rotation of the brake drum 12, e.g. in a direction 71 indicated in FIG. 2. One such wheel stud 28 is shown in FIG. 1. Referring to FIGS. 1 and 5 together, the radially extending brake drum section 14 includes holes 40, each of which can receive one wheel stud 28 to secure a mounting section 42 of the hub 26 within a central opening 44 in the radially extending brake drum section. The drum brake arrangement 10 also includes a camshaft 32, having a cam (not shown) at one end, and a brake shoe 36 or, as shown in FIG. 5, multiple brake shoes 36, movable by way of the cam.

Each brake shoe 36 includes at least one friction lining 30 (hereafter referred to as a "friction pad") secured by fasteners 34 to an associated support table or flange 38. Upon rotation of the camshaft 32, produced by an appropriate actuator, each brake shoe 36 is urged in a conventional manner against the action of a return spring (not shown) to bring the outer surface of each friction lining 30 into contact with the wear surface 24. Friction between the lining or linings 30 and the wear surface 24 upon this contact produces a braking action, retarding rotation of the brake drum 12 and the rotatable hub 26 to slow the rotation rate of a vehicle wheel (not shown) associated with the hub.

Drum wear should be prevented from taking the form of wear ridges in the surface 24 adjacent inboard and outboard edges of the linings 30, as this can interfere with dust egress. The cylindrical wall 18 of the drum 12 is thickened at a location of the wear surface 24 to raise the wear surface. The raised wear surface 24 helps allow the drum 12 to wear to its maximum wear limit, and, as will be described, the drum 12 is configured in such a way that the wear occurs without creating ridges that could prevent dust egress. The arrangement 10 illustrated in FIG. 1 is provided with a dust shield 46, which may be attached in a known manner to the spider (not shown) of the arrangement 10, to at least partially close off the brake drum interior volume or chamber otherwise surrounded by the radially extending brake drum section 14, the corner section 16, and the cylindrical wall 18. The dust shield 46 illustrated includes a first opening 48, permitting passage of the camshaft 32 to the internal volume of the brake drum 12 for brake shoe operation, and a second opening 50, permitting visual inspection of lining wear. The dust shield 46 remains stationary, and thus must be spaced from the end surface 52 of the rotatable brake drum wall 18. An enlarged rim 72 may be included on the cylindrical wall 18 adjacent to the end surface 52 to strengthen and structurally reinforce the brake drum 12.

Figure 4:
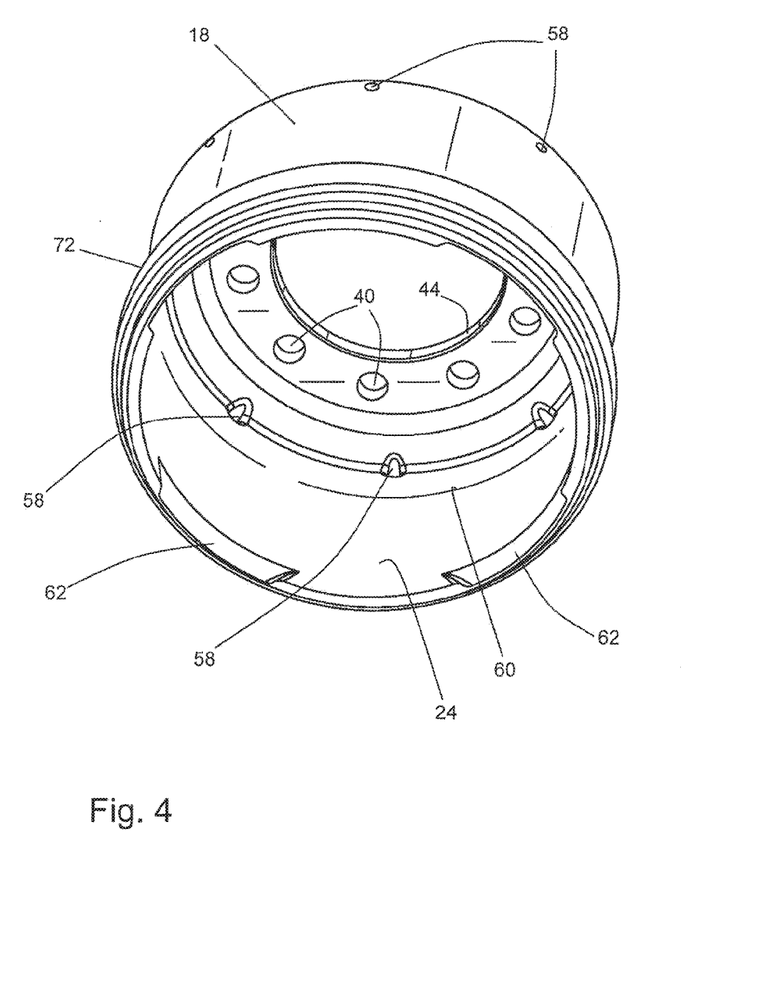
FIG. 4 is a view from in front of and above the drum of the arrangement shown in FIG. 1.

Each lining 30 may have a notch or recess 54 at its circumferential ends, although in the preferred version of the invention, such a notch or recess is not required. The linings 30 are "notched" in this way to allow accurate thickness inspections, which can be perfoiled using the inspection window formed by the second dust shield opening 50 or by simply removing the dust shield 46. The drum 12 illustrated includes a chamfer 56 as a transition between the wear surface 24 and the end surface 52. Another chamfer 60, opposite the chamfer 56 and configured similarly to that chamfer 56, is illustrated as a transition between the wear surface 24 and the interior drum surface 20 of either a remaining section of the cylindrical wall 18 or the corner section 16. The actual wear surface 24 is disposed between the chamfers 56 and 60. Dust egress holes 58 are shown as extending between the interior drum surface 20 and the exterior drum surface 22 are distributed at appropriate locations around the drum 12, although only a single such dust egress hole could be used if desired. The dust egress hole or holes could be drilled or otherwise formed at a location or locations that help with balancing the drum during a machining process. As best shown in FIG. 4, eight of these dust egress holes 58 are approximately uniformly distributed about the drum 12 at locations between the chamfer 60 and the junction between the corner section 16 and the cylindrical wall 18.

While the dust shield 46 acts, in part, to minimize intrusion of contaminants from outside the vehicle into the brake drum interior volume, particles generated during frictional contact between the lining or linings 30 and the wear surface 24 can still lead to the brake drum wear and scoring problems documented by the Huang et al. paper noted above. To address problems caused by particles generated during braking operations, the brake drum arrangement 10 acts to provide multiple brake dust egress paths.

A series of cut away sections 62 is incorporated into both the wear surface 24 itself and the chamfer 56 forming the transition between the wear surface 24 and the end surface 52 of the brake drum wall 18. FIGS. 4 and 5 show four such cut away sections 62 in the drum 12, with the cut away sections 62 distributed around the wall 18 at roughly the same circumferential spacing. If desired, as few as one cut away section or more than four cut away sections could be used. If only one cut away section 62 is used, it could conceivably extend, for example, over 350 degrees around the drum circumference. Having the cut away section or sections 62 extend only partially around the drum circumference is advantageous, in that this structure produces a "cutter" that removes any lip created on each lining 30. The cut away section or sections 62 preferably end at a maximum drum diameter wear limit, as will be described. In particular, when a wall 63 (FIG. 3) of the cut away section 62 is or walls 63 of the cut away sections 62 are no longer visible upon inspection using the opening 50 or after removing the dust shield 46, it is readily apparent that the drum 12 must be replaced.

In the particular illustration supplied by FIG. 2, the edges of each cut away section 62 define a trapezoid in plan view, with non-parallel sides of the trapezoid forming legs 68 and 70 interconnecting parallel bases 64 and 66 of the trapezoid, with the longer base 64 disposed closer to the cylindrical wall end surface 52, and with the shorter base 66 disposed between the longer base 64 and the radially extending drum section 14 so that the shorter base is located closer than the longer base to the radially extending drum section 14. Referring to FIG. 3 once again, the maximum drum diameter wear limit is present at a point at which a cut away section wall 63 is no longer visible, so that the trapezoid base 66 aligns with the wear surface 24. Even though the cut away sections 62 eliminate a portion of the wear surface 24, that wear surface is still maintained to some extent entirely across the width of the lining 30. The longer base edge 64 of each cut away section preferably extends approximately 1 inch to 5 inches circumferentially along the transition between the drum wear surface 24 and the drum end surface 52. Each cut away section 62 operates to facilitate dust egress along paths as will be discussed.

Figure 3:
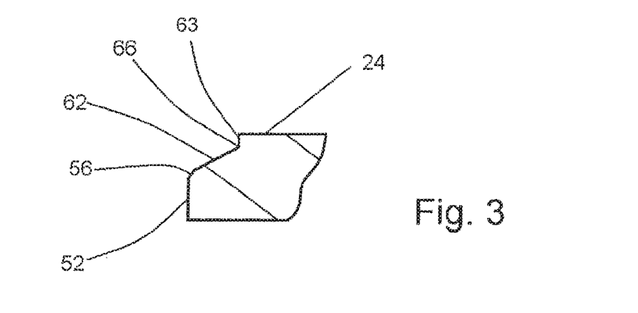
FIG. 3 is a part-sectional view in direction III-III of FIG. 2.

As best shown by way of example in FIG. 3, a surface of the chamfer 56 may be oriented at a roughly 45 degree inclination relative to the end surface 52 of the rotatable brake drum wall, while a surface of each cut away section 62 may be oriented at a roughly 60 degree inclination relative to the drum end surface 52. These angular orientations, of course, can be varied as deemed appropriate. Regardless of the particular configuration of the cut away sections 62, up to the wear limit of the brake drum 12, when the cut away section or sections 62 are eliminated due to wear, the cut away sections 62 provide a suitable egress path for brake dust generated during braking operations. In one preferred arrangement, the chamfer 56 is an inboard chamfer for dust egress, while the other chamfer 60 is an outboard chamfer, facing a wheel, leading to the dust egress hole or holes 58 in the drum 12.

Centripetal force acting on attrition product, i.e. brake particles or dust, generated during frictional contact between the lining or linings 30 and the wear surface 24, as well as on any external debris entering into the drum interior volume or chamber, forces the particles, dust, and debris to travel radially with respect to the brake drum 12. The attrition product and debris will then exit the brake drum interior volume or chamber along multiple egress paths indicated by arrows in FIG. 1, thereby minimizing the brake drum wear and scoring problems noted previously. These egress paths include a first path from the drum interior volume or chamber over the cut away sections 62 incorporated into the wear surface 24 and the chamfer 56, and then either through the second dust shield opening 50 or through the spacing between the end surface 52 of the rotatable brake drum wall 18 and the dust shield 46, as well as a second path from the drum interior volume or chamber through the dust egress holes 58 distributed at appropriate locations around the drum 12. The first egress path can thus remain unobstructed, even near the wear limit of the drum 12, when the cut away sections 62 have been almost completely eliminated. In this way, dust build-up in the drum interior volume or chamber is prevented, and each lining 30 is allowed to wear without forming a ridge, allowing lining thickness to be monitored and inspected using current procedures. Excessive or uneven wear of the brake drum wear surface 24 due to brake dust generated during braking operations can be reduced or eliminated by the improved ventilation of the brake drum interior volume or chamber accordingly, resulting in both enhanced brake lining durability and extended brake drum life.

Figure 6:
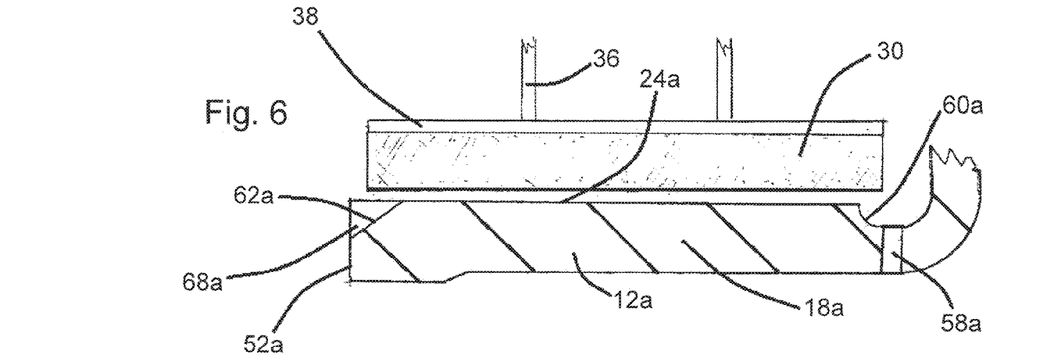
FIG. 6 is a partial view, in section, of a brake lining and a slightly modified version of a drum according to the invention when the drum and the lining are in new condition.

FIG. 6 is a view, in section, of part of a brake lining 30, secured in a manner mentioned previously on the support table or flange 38 of a shoe 36, and a slightly modified version of a drum 12a according to the invention. FIG. 6 shows the lining 30 and the drum 12a in new condition. The drum 12a illustrated includes a cylindrical wall 18a, a raised wear surface 24a, an end surface 52a, a dust egress hole or holes 58a, a chamfer 60a, a short cut away section or cut away sections 62a, and a trapezoid side or leg 68a formed by an edge of the cut away section 62a. These features are essentially the same as the wear surface 24, the dust egress hole or holes 58, the chamfer 60, the cut way section 62, and the leg 68 discussed previously, except that no part of a chamfer similar to the chamfer 56 identified in FIGS. 1-3 is shown as located between the end surface 52a and the cut away section 62a of the drum 12a.

Figure 7:
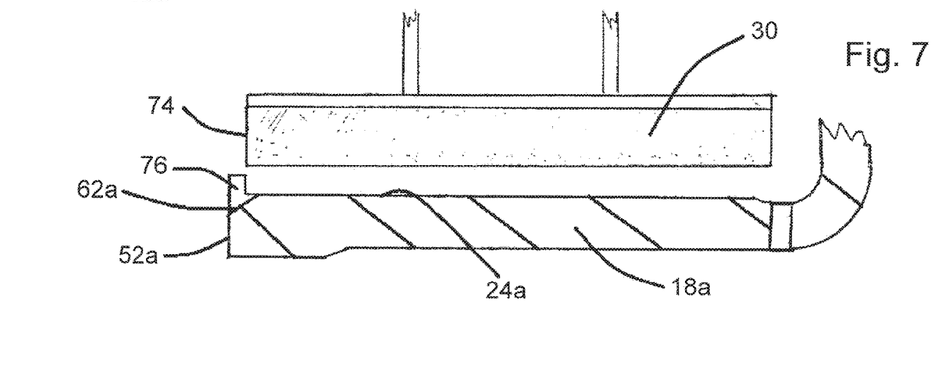
FIG. 7 is a view similar to FIG. 6, but showing the drum and the lining in full worn condition.

In the drum and lining full worn condition illustrated in FIG. 7, frictional contact between the lining 30 and the drum wear surface 24a has displaced much of the wear surface 24a radially outwardly. Because the cylindrical wall 18a extends beyond an axial end 74 of the lining 30, a wear ridge 76 is formed between the end surface 52a of the drum and the displaced portion of the wear surface. In the full worn condition, the edge of the worn lining 30 remains square, allowing accurate visual or optical wear inspection via the dust shield opening 50 (FIG. 1) and the remaining portion of the cut away section or sections 62a.

Figure 8:
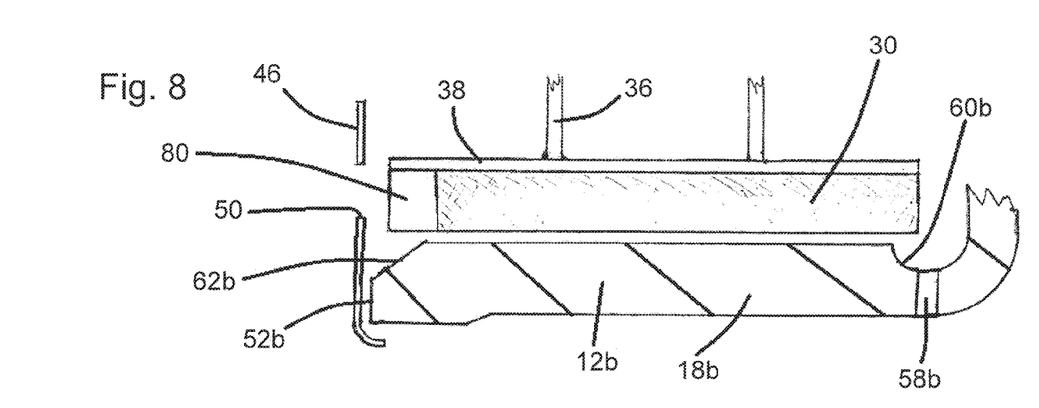
FIG. 8 is a partial view similar to that of FIG. 6, but illustrating a dust shield and showing the brake lining as having an inspection notch.

FIG. 8 is a view similar to that of FIG. 6, showing a brake lining 30 secured in the manner mentioned previously on the support table or flange 38 of a brake shoe 36, a dust shield 46 with an opening 50 permitting visual inspection of lining wear, and another slightly modified version of a drum 12b according to the invention. The drum 12b illustrated in FIG. 8 includes a cylindrical wall 18b, a raised wear surface 24b, an end surface 52b, a dust egress hole or dust egress holes 58b, a chamfer 60b, and a continuous cut away section 62b. As the cut away section 62b is continuous, no trapezoid side or leg corresponding to the leg 68 indicated in FIG. 2 or the leg 68a indicated in FIG. 6 can be seen. The features mentioned are otherwise essentially the same as corresponding features mentioned previously. As with the embodiment shown in FIG. 6, no part of a chamfer similar to the chamfer 56 identified in FIGS. 1-3 is located between the end surface 52b and the cut away section 62b of the drum 12b.

Figures 9, 10:
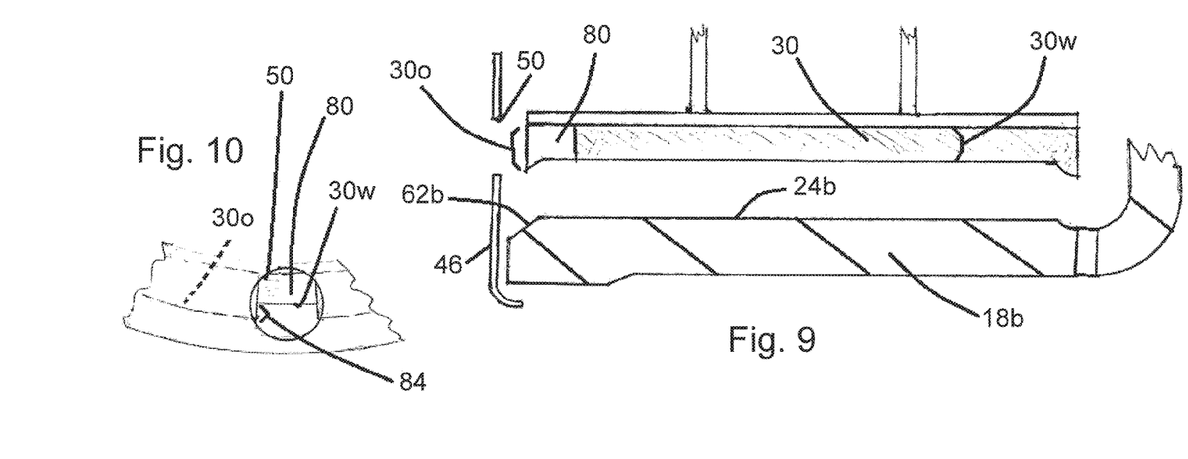
FIG. 9 is a view similar to that of FIG. 7, but illustrating a dust shield and showing the drum and the brake lining with the inspection notch in full worn condition.
FIG. 10 is a view of the brake lining inspection notch of FIG. 9 through a visual inspection opening provided in the dust shield.

Referring now to FIG. 9 as well as FIG. 8, the lining 30 in this embodiment is provided with an inspection notch 80 visible through the visual inspection opening 50 in the dust shield 46. The drum 12b and the brake lining 30 with the inspection notch 80 are shown in FIG. 9 in full worn condition. The opening 50 permits visual or optical evaluation of the true lining thickness, and hence the amount 84 of lining wear, as is evident from the view supplied by FIG. 10, with this amount 84 of lining wear corresponding to the difference between the unworn or original thickness 30o and the full worn thickness 30w of the lining 30 and being readily visible through the visual inspection opening 50 in the dust shield.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:
1. A brake drum usable in a vehicle, comprising:
a substantially cylindrical wall having an end surface at one axial cylindrical wall end, the substantially cylindrical wall defining a radially inwardly facing wear surface to be engaged by a friction lining upon brake actuation during operation of the vehicle, and a radially extending drum section joined by way of a corner section to another axial end of the substantially cylindrical wall and, together with the substantially cylindrical wall and the corner section, forming a drum interior volume, wherein the substantially cylindrical wall has a circumferentially extending cut away section in the wear surface located adjacent to the one axial end providing for discharge of particles from the drum interior volume, wherein the cut away section defines a trapezoid, and wherein the trapezoid includes shorter and longer bases, and the shorter base faces outboard and is located closer to the radially extending drum section than the longer base.

2. The brake drum according to claim 1, wherein the circumferentially extending cut away section is one of a plurality of circumferentially extending cut away sections distributed around the radially inwardly facing wear surface.

3. The brake drum according to claim 1, wherein the drum includes holes, extending between an interior drum surface and an exterior drum surface, distributed around the drum at locations between the wear surface and the radially extending drum section.

4. The brake drum according to claim 1, wherein the substantially cylindrical wall further includes chamfers at opposite axial ends of the wear surface, and the cut away section intersects one of the chamfers adjacent the end surface at the one axial end of the substantially cylindrical wall.

5. The brake drum according to claim 1, wherein the longer base extends from one inch to five inches circumferentially in the substantially cylindrical wall.

6. The brake drum according to claim 1, wherein a wear limit for the brake drum is present when the wear surface is sufficiently worn that a wall of the cut away section is eliminated.

7. The brake drum according to claim 4, wherein one of the chamfers is an inboard chamfer for dust egress, and another of the chamfers is an outboard chamfer, facing a wheel, leading to at least one dust egress hole in the drum.

8. A vehicle including a drum brake having a brake drum, the brake drum comprising:

a substantially cylindrical wall having an end surface at one axial cylindrical wall end, the substantially cylindrical wall defining a radially inwardly facing wear surface to be engaged by a friction lining upon brake actuation during operation of the vehicle, and a radially extending drum section joined by way of a corner section to another axial end of the substantially cylindrical wall and, together with the substantially cylindrical wall and the corner section, forming a drum interior volume, wherein the substantially cylindrical wall has a circumferentially extending cut away section in the wear surface located adjacent to the one axial end providing for discharge of particles from the drum interior volume, wherein the cut away section defines a trapezoid, and wherein the trapezoid includes shorter and longer bases, and the shorter base faces outboard and is located closer to the radially extending drum section than the longer base.

9. The vehicle according to claim 8, wherein the circumferentially extending cut away section is one of a plurality of circumferentially extending cut away sections distributed around the radially inwardly facing wear surface.

10. The vehicle according to claim 8, wherein the drum includes holes, extending between an interior drum surface and an exterior drum surface, distributed around the drum at locations between the wear surface and the radially extending drum section.

11. The vehicle according to claim 8, wherein the substantially cylindrical wall further includes chamfers at opposite axial ends of the wear surface, and the cut away section intersects one of the chamfers adjacent the end surface at the one axial end of the substantially cylindrical wall.

12. The vehicle according to claim 8, wherein the longer base extends from one inch to five inches circumferentially in the substantially cylindrical wall.

13. The vehicle according to claim 8, wherein a wear limit for the brake drum is present when the wear surface is sufficiently worn that a wall of the cut away section is eliminated.

14. The vehicle according to claim 11, wherein one of the chamfers is an inboard chamfer for dust egress, and another of the chamfers is an outboard chamfer, facing a wheel, leading to at least one dust egress hole in the drum.

15. The vehicle according to claim 8, wherein the drum brake includes brake shoes, at least one of the brake shoes supports a friction lining movable into and out of contact with the wear surface, and said friction lining has an inspection notch allowing accurate evaluation of wear on the friction lining.

* * * * *